Dec. 8, 1959   E. D. COLEMAN   2,916,033
METHOD AND APPARATUS FOR DETERMINING
RATE OF EVOLUTION OF A GAS
Filed Jan. 24, 1951
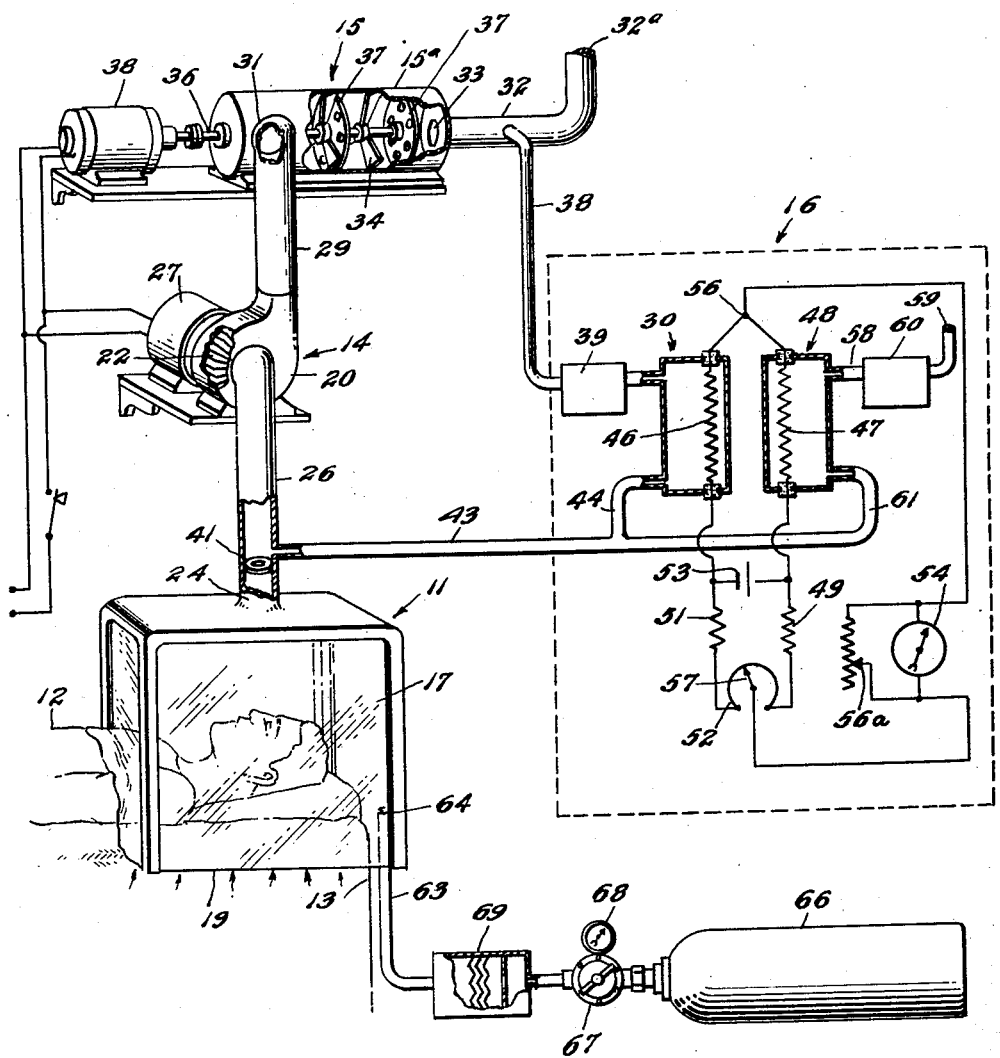
Inventor
Edwin D. Coleman
By
McCanna and Morsbach
Attys United States Patent Office 2,916,033
Patented Dec. 8, 1959

2,916,033

METHOD AND APPARATUS FOR DETERMINING RATE OF EVOLUTION OF A GAS

Edwin D. Coleman, Maywood, Ill.

Application January 24, 1951, Serial No. 207,456

14 Claims. (Cl. 128—2.07)

This invention relates to a method and apparatus for determining the rate of evolution, production, delivery or consumption of a gas, one phase of the invention relating to such method and apparatus as exemplified in apparatus for determining the oxygen consumption, carbon dioxide evolution, respiratory quotient, basal metabolic rate and the like of a human being.

An apparatus suitable for use in the determination of the basal metabolic rate of a human being is herein shown and described for the purpose of illustrating the invention, though the invention has substantially broader application and may be embodied in devices for other specific purposes, as will be apparent from this disclosure.

One serious disadvantage in past devices for determining basal metabolic rate has been that masks have been required which are strapped onto the patient's face to supply pure oxygen to the patient. In most cases this rather unusual procedure and the attendant discomfiture produces a state of tension in the patient, whereas the purpose is to conduct the test with the patient wholly at rest. Obviously the true indication of the basal rate cannot be obtained under such conditions, and this is one reason why such tests are frequently unreliable.

In obtaining a representative sample from any source it is, of course, imperative that the sampling means offer no interference in the functioning of the source and that the amount of sample being collected, or the measurement of the collected sample, be exactly proportional to the rate at which the sample is being evolved. These two requirements are particularly critical in apparatus such as here under consideration.

An important phase of the invention is the provision of a method and apparatus wherein the source of gas is allowed to discharge in a normal manner into substantially its customary discharge space, while the influx of a different gas into this space occurs at a governed rate. The two gases are mixed, and the mixed gases, which contain the source gas in amount proportional to the rate of discharge, are analyzed for the source gas.

Another object of the invention is to provide apparatus wherein the source of gas discharges into a stream of a reference carrier gas, the mixture thus produced flowing at a constant rate, and the mixture is thereafter analyzed to determine the rate of delivery of the gas from this source.

Another object of the invention is the provision of basal metabolism testing apparatus wherein the patient always breathes fresh air, has unrestricted and unhampered respiratory action, and in which there is substantially no obstruction to either the sight or the hearing of the patient, so as to avoid any material interference with the normal functioning of the source.

A further object of the invention is the provision of a device of the character described in which the patient breathes atmospheric air during the course of the tests and is not required to breath pure oxygen, or to respire into the usual mask, or to supply, by his lung muscles, any part of the energy required to actuate the device.

Another object of the invention is the provision of a device of the character described wherein the patient breathes in a stream of air flowing at a governed rate and the change in concentration of a constituent of the air is continuously measured to continuously measure and indicate the metabolic rate.

An important object of the invention is the provision of novel means for continuously measuring and indicating the metabolic rate of a patient under test.

Other objects and advantages appear from the following description and the accompanying drawings, in which:

The figure is a diagrammatic view of a preferred embodiment of the apparatus embodying the invention and suitable for determining the basal metabolic rate.

The invention is shown in the figure embodied in a device for determining the basal metabolic rate as being illustrative of a device utilizable in connection with a consuming device or a source of a gas which is delivered at a variable rate, intermittently, or which may likewise consume a portion of the gas intermittently during the period of operation and which may concurrently show periodic or erratic variation in concentration of the constituent under consideration. This is but one practical application of the invention, and in its broader aspects it may be used in numerous other similar applications. For example, another such source is the exhaust of the gasoline engine operating with defective ignition equipment or improper gas mixture.

In the embodiment herein shown, the apparatus includes the gas receiver or hood indicated at 11, suspended over the face of a patient 12 reclining on a table 13 or the like, a constant volume pump 14 connected to the hood for effecting the passage of air through the hood, an accumulator 15 connected with the pump and receiving therefrom the discharge of the stream of air and the patient's breath, and measuring means 16 for measuring the concentration of the patient's breath under consideration in the air-breath mixture discharged from the accumulator.

The hood 11 hangs freely around the face of the patient in the manner of a tent and has a relatively large chamber 17 so that the patient can breathe freely in a normal manner. The bottom 19 of the hood is open and the chamber 17 is thus in open communication with the atmosphere, so that when the pump 14 is in operation there is a free flow of air into the chamber about the head of the patient. Preferably the hood is formed of thin transparent material such as cellophane so that the patient can see and talk with the attendant operating the apparatus. Under these circumstances the patient attains metabolic stability much more rapidly than with the use of prior equipment requiring a tight fitting mask with a clamp on the nose of the patient.

The pump 14 may be any pump adapted to deliver a substantially constant volume of gas with respect to time, such as certain well known types of piston, vane or diaphragm pumps. For the purpose of illustrating the invention, the vane type pump is herein shown and includes a casing 20, a rotor in the casing, and vanes 22 slidably mounted on the rotor in the usual manner to effect the flow of gas through the pump at a constant rate. The pump 14 is driven by a motor 27, preferably a synchronous type electric motor, and the inlet side of the pump is connected to the output 24 in the hood 11 by a conduit 26.

The outlet of the pump is connected to an inlet port 31 of the accumulator through a conduit 29. The accumulator 15 may take any of a number of forms, and is essentially a storage and mixing device. One suitable construction comprises a tank 15a having the inlet 31 and an outlet 33. Disposed within the tank are one or more impeller blades 34 which may be mounted upon a shaft 36 driven by an electric motor 38. The shaft has bearing support in the wall of the tank and in a cross partition 37 provided with ports permitting the free passage of the gas therethrough between the inlet port 31 and the outlet port 33. The capacity of the accumulator should be sufficient so that a truly average sample of gas under test is obtained. Its capacity should be at least sufficiently great to hold the entire volume of gas delivered by the pump 14 during one breathing cycle of the patient, comprising an inhalation and an exhalation, so that the differences in the composition of the gas produced thereby will be averaged by the accumulation and mixing of the gas in this chamber.

Instead of using a gas accumulator, a true average measurement of the gas sample may be obtained by slowing down the rate of response of the measuring means 16 so as to, in effect, integrate the gas evolved during an entire breathing cycle, rather than responding to each instantaneous value of gas at a particular time during the breathing cycle.

In use, the hood 11 is suspended over the head of the patient as shown in the drawing with the sides of the hood disposed at a lower level than the head so that air can be readily drawn into the bottom opening about the head of the patient. Since there is nothing to restrain or interfere with the breathing of the patient, he breathes in a normal manner and will rest perfectly relaxed. The pump 14, which is driven by the synchronous motor 27, has a constant volumetric output and causes a constant volume stream to be drawn through discharge outlet 24. During the test the patient breathes in air from this stream and exhales into the stream. When the patient breathes in, sufficient air flows into the hood to supply the patient and the pump which has a constant output, and when the patient exhales the amount of air entering the hood decreases due to the patient's breath being added to the stream. Thus the air stream flowing through the outlet 24 of the pump is in effect a pulsating stream insofar as the quantity of exhaled gas under consideration is concerned with the frequency of the exhaled gas pulses corresponding to the breathing of the patient. The pump 14 discharges the mixture into the accumulator 15, where the gas discharged from the patient's lungs and the excess air are thoroughly intermixed by the impellers 34. As the gas mixture passes through the conduit 32 a portion thereof is drawn into conduit 38 by the action of a restriction orifice 41 and this gas passes through a drier 39, a conductivity cell 30 and conduits 44 and 43 back into the conduit 26, an indication of the carbon dioxide content of the mixture being effected in the cell 30. The remainder of the gas mixture in conduit 32 which is not drawn into conduit 38 is exhausted to the atmosphere out of orifice 32a, which is preferably spaced remote from hood 11 so as not to materially affect the test results.

It will be noted that while the indication given in response to the passage of the gas mixture through the cell 30 is proportional to the total amount of carbon dioxide present in the mixture, it is not a direct measure of the amount of, or time rate of evolution, of carbon dioxide produced by the patient. Obviously the air entering the bottom of the hood 11 contains an appreciable concentration of carbon dioxide. This concentration is a constant factor and means are provided for balancing out the effect of this concentration so that the instrument can be made to read directly in concentration of carbon dioxide evolved by the patient, or if desired, in metabolic rate.

The concentration of carbon dioxide in the gas mixture flowing from the accumulator 15 may be measured in a number of well known ways, but in the preferred form of the invention, is measured by means of thermal conductivity cells such as described by Palmer and Weaver in Technologic Papers of the Bureau of Standards, No. 249, dated 1924. This invention, however, contemplates a novel combination of thermal conductivity cells with other elements to effect circulation of a sample of the gas mixture through a cell and to effect compensation for the carbon dioxide normally present in the air. To this end a conductivity cell 30 is connected to the conduit 32 by the conduit 38, the drier 39 preferably being interposed in the conduit to remove the moisture from the sample of intermixed gases flowing to the cell. The opposite side of the cell 30 is connected to the conduit 26 between the hood and the pump through conduits 43 and 44, thus producing a recirculation path for the sample extending from the conduit 32 through conduit 38 and drier 39, the cell 30, and the conduits 43 and 44 to the conduit 26. Interposed in the conduit 26 slightly upstream from the connection of the conduit 43 therewith is a restriction having an orifice 41, which, in response to the flow of gas through a conduit 26 under the action of the pump, provides a low pressure area at the point where conduit 43 is connected. This acts to draw the gas through the cell 30 by Venturi action. A second conductivity cell 48 has an outlet conduit 61 connected to the conduit 43 and an inlet conduit 58 likewise incorporating a drier 60. The open end 59 of the conduit 58 may be disposed adjacent the inlet side of the hood 11, though this is not normally necessary. The low pressure area adjacent orifice 41 thus also serves to draw atmospheric air into the cell 48 through conduit 58. Though the gas from the conductivity cells is delivered to the inlet side of the pump, the volume thereof is insignificant and does not appreciably affect the accuracy of the device.

Instead of recirculating the samples as above described, the outlets of the conductivity cells could communicate with the atmosphere to discharge the samples, but this would require a greater capacity pump. As a practical matter such precautions are unnecessary because recirculating the samples does not appreciably alter the concentrations in the main gas stream.

The concentration of carbon dioxide in the gas passing through cells 30 and 48 is measured by a suitable bridge network such as disclosed in the aforesaid technical paper of the Bureau of Standards, to which reference may be made for a more detailed discussion of the structure and theory of operation. In general, the arms of the bridge network in the form herein illustrated, include a hot wire 46 in the cell 30 and a hot wire 47 in a reference cell 48, a resistance element 49, and a resistance element 51. A potentiometer 52 is connected between the resistance elements 49 and 51. Battery 53 is a source of power for energizing the bridge network in the usual manner. The opposite ends of the hot wires 46 and 47 are interconnected at 56 and a meter 54 is connected between the juncture 56 and the variable tap 57 on the potentiometer 52 for indicating unbalance of the bridge circuit. A variable shunt resistor 56a is connected in parallel with the meter 54 for calibration purposes. The meter may be calibrated to read directly in concentration of carbon dioxide or in units of metabolic rate.

It will be noted that, with the instrument comprising the conductivity cells and the network above described, the response of the cell 30 is proportional to the total carbon dioxide delivered through the conduit 32, which is made up of two components, one being the carbon dioxide source gas evolved by the patient, and the other being the carbon dioxide present in the carrier stream of air drawn into the hood 17. On the other hand, the response of the conductivity cell 48 is proportional only to the carbon dioxide in the carrier stream. Since the response of the cell 48 is placed in opposition to the response of the cell 30, the meter 54 responds only to the difference and hence may be calibrated in units of concentration or if desired, in units of metabolic rate.

With the above described equipment the accuracy of the readings will depend upon the accuracy with which the pump output rate can be determined and also on the constancy of calibration of the meter network. However, the rate of evolution of the source may be accurately determined when the rate of delivery of the pump is not know, but is constant, and there is no absolute calibration of the measuring device. To this end, the invention may desirably incorporate a novel method and means for calibrating the apparatus without the necessity for determining the output of the pump or calibrating individual parts of the apparatus. This is accomplished by means of a gas cylinder 66 containing the source gas under pressure, for example, carbon dioxide in substantially pure state. The cylinder is connected through a control valve 67 and pressure gauge 68 to a turbulence chamber 69. The gas released from the cylinder passes through the control valve and turbulence chamber to a pipe 63 from which it discharges at the end 64 located within the hood 11. A preferred manner of calibrating the apparatus is to place the apparatus in operation in the absence of a patient or other source within the hood 11 and to introduce into the hood for admixture with the air or other stream of gas passing therethrough, gas from the cylinder 66 at a known rate. The shunt resistance 56a is then adjusted until the meter indicates the known rate at which the source gas is being introduced at 64. This brings the meter into calibration and it will thereafter indicate directly the rate of delivery of the source gas into the stream. Thereafter the source under investigation may be introduced into the hood for the desired investigation.

An alternative, but less desirable, method is to first introduce the unknown source into the hood and note the reading on the meter 54, thereafter introduce the source gas from cylinder 66 at a known rate and note the second and higher meter reading. The difference between these two readings is proportional to the rate of evolution from the unknown source and the rate of evolution may be calculated.

In the preferred embodiment as herein shown the gas is liberated from pressure cylinder 66 through an ordinary valve 67 into turbulence chamber 69. This chamber may take a number of specifically different forms, the purpose being to liberate the gas with maximum turbulence. Under such circumstances the rate of flow of the gas is dependent upon the square root of the pressure, and consequently the delivery pressure of the gas need not be critically controlled in order that the delivery of the gas from the pipe 63 occur at a substantially constant rate. One suitable construction is shown wherein the chamber 69 has a multiplicity of jagged orifices through which the gas is caused to flow as the pressure is released, the gas after passing through the orifices impinging upon other surfaces to produce maximum turbulence. In lieu of the use of such a turbulence chamber the valve 67 may be any of the commonly used constant pressure valves.

It will be understood that while only a single gas concentration testing instrument is herein shown, a multiplicity thereof may be concurrently employed. For example, there may be a number of units such as shown at 16, each of which has a supply pipe 38 leading from the conduit 32 and a return conduit such as shown at 44 and 43, each of these units being arranged to conduct a separate test so that the meters could read simultaneously the rate of carbon dioxide evolution, the rate of oxygen consumption and the respiratory quotient of the patient. Bridge networks and meters suitable for effecting such analyses are described in the aforesaid publication of the National Bureau of Standards and also in a publication entitled "Gas Analysis by Measurement of Thermal Conductivity" by H. A. Daynes, published by the Cambridge University Press, 1933.

While a specific embodiment has been shown for purposes of describing the invention, it will be understood that various changes and modifications may be made without departing from the spirit of my invention.

I claim:

1. In gas testing apparatus for determining the rate of delivery of a gas from a source having a varying rate, the combination of a gas receiver having an opening communicating with a source of a reference carrier gas and having a discharge outlet and being arranged to receive the discharge of a varying gas source at a point intermediate said opening and said discharge outlet, constant volume pump means communicating with said discharge outlet for effecting the entry of the carrier gas into the gas receiver and the passage thereof together with the varying gas through said chamber and said discharge outlet, a mixer connected to said pump to receive the gas mixture upon discharge from the pump and intimately mix the same, and means connected to said mixer for measuring the concentration of the varying gas in said mixture upon discharge from the mixer.

2. In gas testing apparatus for determining the rate of delivery of a gas from a source having a varying rate, the combination of a collecting chamber having a discharge outlet and communicating with a source of a carrier gas and said varying source, a constant volume pump connected to said outlet for effecting the flow of said carrier gas and said varying gas through said discharge outlet at a constant rate, an accumulator communicating with the discharge of said pump to receive the gas mixture therefrom, means for thoroughly mixing the carrier gas and the varying gas in said accumulator, and means communicating with said accumulator for measuring the concentration of the varying gas in the mixture passing from said accumulator.

3. In gas testing apparatus for determining the rate of delivery of gas from a source having a varying rate, the combination of a gas collecting chamber having a discharge outlet and communicating with a source of a carrier gas and with said varying source, a constant volume pump connected to said outlet for drawing said carrier gas and said varying gas through said discharge outlet at a constant rate, an accumulator connected to the discharge of said pump to receive the gas mixture from the pump, said accumulator having a capacity at least as great as the entire volume of gas delivered by the pump during a complete cycle of the varying source, means for mixing the varying gas and carrier gas in said accumulator, and means communicating with said accumulator for measuring the concentration of the varying gas in said mixture after it has been mixed.

4. In a gas testing apparatus for analyzing a gas from a source having a varying rate, the combination of a collecting chamber communicating with a source of a carrier gas and with said varying source and having a discharge outlet, a constant volume pump communicating with said discharge outlet for drawing gas from said chamber through said outlet, a synchonous motor for driving said pump, an accumulator having an inlet communicating with said pump to receive the gas stream discharged from said pump and having an outlet communicating with the atmosphere, and means communicating with the accumulator for measuring the concentration of said varying gas in the stream in the accumulator prior to discharge to the atmosphere.

5. In gas testing apparatus for analyzing a gas from a source having a varying rate, the combination of a collecting chamber communicating with a source of a carrier gas and with said varying source and having a discharge outlet, constant volume pump means communicating with said discharge outlet for drawing gas from said chamber through said outlet, means for measuring the concentration of the varying gas in said stream after discharge from said pump means including a thermal conductivity cell having its inlet in communication with the discharge side of the pump means, means between the collecting chamber and the pump means for creating a low pressure area adjacent the pump means, and a conduit communicating between the low pressure area and the outlet of said thermal conductivity cell for drawing a sample from the discharge side of the pump means through said cell.

6. In gas testing apparatus for analyzing a gas from a source having a varying rate, the combination of a collecting chamber communicating with a source of a carrier gas and with said varying source and having a discharge outlet, constant volume pump means communicating with said discharge outlet for effecting the flow of a gas stream through said chamber, means for measuring the concentration of the varying gas in the combined gas stream discharged from the pump means including a sample thermal conductivity cell having its inlet in communication with the outlet of the pump means, a reference thermal conductivity cell having its inlet in communication with a source of the carrier gas, and orifice means between the discharge outlet of the collecting chamber and the inlet of said thermal conductivity cell for creating a low pressure area thereat, and conduit means communicating between said low pressure area and the outlets of said sample thermal conductivity cell and said reference cell for drawing a sample from said gas stream beyond the outlet of the pump means through the sample conductivity cell and for drawing the carrier gas through the reference cell.

7. Apparatus for making basal metabolism tests comprising a hood shaped to fit loosely over the head of the patient and permitting normal breathing, said hood being formed with an inlet communicating with the atmosphere and having a discharge outlet, positioned to receive the breath exhaled by the patient, means communicating with said discharge outlet for effecting a flow of an air-breath stream out of said discharge outlet at a constant rate, and means communicating with said discharge outlet for determining the concentration of carbon dioxide in said stream.

8. In apparatus for use in making basal metabolism tests, the combination of a hood shaped to fit over the head of a patient and providing for freedom of normal breathing of a patient into the hood, said hood communicating with the atmosphere and having a discharge outlet, a constant volume pump having its inlet communicating with said discharge outlet for drawing air through said hood and the breath of said patient through said outlet, and means communicating with the outlet of said pump for measuring the average concentration of carbon dioxide gas in the air-breath stream subsequent to its discharge from the pump.

9. In apparatus for making basal metabolism tests, the combination of a hood shaped to extend over the head of the patient and providing for normal breathing of the patient into the hood, said hood having an air inlet communicating with the atmosphere and having a discharge outlet, a constant volume pump having its inlet communicating with said discharge outlet for drawing a stream of air and the patient's breath out of said hood through the discharge outlet, means for mixing the air-breath stream, an accumulator communicating with the outlet of said pump for receiving the air-breath stream, said accumulator having a capacity at least as great as the entire volume of the air-breath stream drawn by the pump through said discharge outlet in the hood throughout a complete breathing cycle of the patient, and means communicating with said accumulator for measuring the carbon dioxide content of the air-breath stream.

10. In a gas testing apparatus for determining the rate of delivery of a gas from a source having a varying rate, the combination of a collecting chamber having a discharge outlet and communicating with a source of a carrier gas and said varying source, a constant volume pump communicating with said outlet for effecting the flow at a constant rate of a combined gas stream consisting of said carrier gas and said varying gas through said discharge outlet, an accumulator communicating with said outlet for receiving said combined gas stream therefrom, means for thoroughly mixing the carrier gas and the varying gas in said accumulator, and means communicating with said accumulator for measuring the concentration of the varying gas in the combined gas mixture passing from said accumulator.

11. In apparatus for use in making basal metabolism tests, the combination of a hood shaped to fit over the head of a patient and providing for freedom of normal breathing of the patient into the hood, said hood having an opening communicating with the atmosphere and having a discharge outlet, a constant volume pump having its inlet communicating with said discharge outlet for drawing air into the hood and for drawing said air and the patient's breath through said discharge outlet, and means communicating with said discharge outlet for measuring the average concentration of carbon dioxide in the air-breath stream subsequent to its passage through said discharge outlet.

12. The method of measuring the rate at which a first gas is converted into a second gas by a test source comprising, producing a continuous stream of the first gas, introducing the second gas at a measured rate below the rate of flow of the first gas stream into the first gas stream, varying the quantity of said first gas in the stream inversely with the quantity of second gas introduced thereinto to produce a combined gas stream of the first gas and the second gas having a constant rate of flow, exposing the combined gas stream to a measuring device which is operative in response to the concentration of the second gas in the combined gas stream, adjusting the operation of the measuring device to correspond to the measured rate at which the second gas is introduced into the first gas stream, drawing the first gas stream past the test source, feeding a portion of the first gas from the first gas stream to the test source, discharging the entire gas output from the test source into the first gas stream, varying the quantity of said first gas in the stream inversely with the quantity of the gas output from the test source to produce a combined gas stream of the first gas and the gas output of the test source having a constant rate of flow, and passing the combined gas stream of said first gas and the output gas of said source to the measuring device to measure the concentration of the second gas from the source in the combined gas stream.

13. The method of determining the rate at which a first gas is converted into a second gas by a test source comprising, passing a continuous stream of the first gas past the gas intake of the test source at a rate in excess of the rate of consumption of the first gas by the test source to thereby feed a portion of the first gas from the stream to the test source, collecting the entire gas output from the test source into said stream, varying the rate of flow of the remaining portion of said first gas stream which is not fed to the test source inversely with the rate of flow of the gas output from the test source to produce a combined stream of the first gas and the gas output of the test source having a constant rate of flow, and continuously measuring the concentration of the second gas in the combined gas stream as a measure of the rate of evolution of the second gas by the test source.

14. The method of making basal metabolism tests which comprises continuously drawing a stream of air past the head of the patient at a rate in excess of the rate of consumption of air by the patient to thereby feed a portion of the stream to the patient, collecting the entire breath of the patient in the air stream, varying the average rate of flow during one breathing cycle of the remaining portion of the air stream which is not fed to the patient inversely with the quantity of breath exhaled by the patient during the breathing cycle to produce an air-breath stream having a constant rate of flow, and measuring the concentration of the carbon dioxide in the air-breath stream as a measure of the rate of evolution of the carbon dioxide by the patient.

References Cited in the file of this patent

UNITED STATES PATENTS

| | | |
|---|---|---|
| 1,200,653 | Sawyer | Oct. 10, 1916 |
| 1,299,540 | Bailey | Apr. 8, 1919 |
| 1,691,600 | Brush et al. | Nov. 13, 1928 |
| 1,783,451 | Rabinowitch | Dec. 2, 1930 |
| 2,152,439 | Miller | Mar. 28, 1939 |
| 2,335,032 | Sullivan | Nov. 23, 1943 |
| 2,341,169 | Wilson | Feb. 8, 1944 |
| 2,429,555 | Langford et al. | Oct. 21, 1947 |